Dec. 6, 1960     J. H. TELLEFSON     2,963,568
STOCK TANK DE-ICER
Filed April 27, 1959

INVENTOR,
JOHN HENRY TELLEFSON
BY *Edward Eversley Bishop*
ATTORNEY

# United States Patent Office 2,963,568
Patented Dec. 6, 1960

2,963,568

STOCK TANK DE-ICER

John Henry Tellefson, Peace River, Alberta, Canada

Filed Apr. 27, 1959, Ser. No. 809,138

2 Claims. (Cl. 219—38)

This invention relates to devices for inhibiting the formation of ice on stock water tanks.

It is common, in cattle raising areas of the country, to provide outdoor watering tanks accessible to the cattle. During warm weather or in climates not subject to freezing temperatures, no difficulty is encountered with tanks of this sort but wherever the temperature falls below freezing, considerable difficulty is encountered. To clear the tanks, it becomes necessary to chop holes in the surface ice on the water or to provide some auxiliary means for heating the water in the tanks to prevent freezing.

Submersible heaters or hot water or air pipes have been used with considerable success although such installations generally are of considerable cost and complexity and have not been widely used.

It is an object of the present device to provide a simple low cost heater for stock watering tanks that may be quickly and easily attached to the tank to inhibit the freezing of water therein.

A further object is to provide a heating device for a stock watering tank that may be quickly and easily removed from the tank when desired and stored with a minimum of difficulty.

A still further object is to provide a heater for a stock watering tank that is economical in operation and that may be actuating from a standard electrical outlet.

Still further objects and advantages of this device will be obvious from a reading of the attached specification in conjunction with the drawings. Obviously, only a preferred embodiment is described and illustrated and various changes and modifications as fall within the scope of the appended claims may be made without departing from the inventive spirit thereof.

Figure 1:
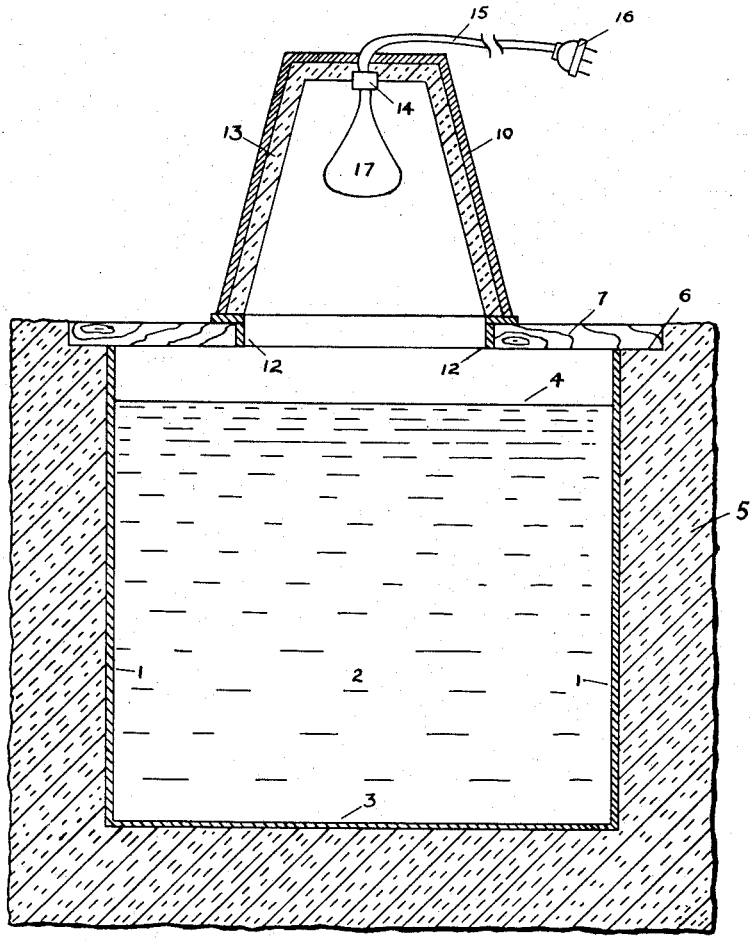
Figure 1 is an end view of a watering tank with my improved heater mounted thereon and partly in section to better illustrate its construction.
Figure 2:
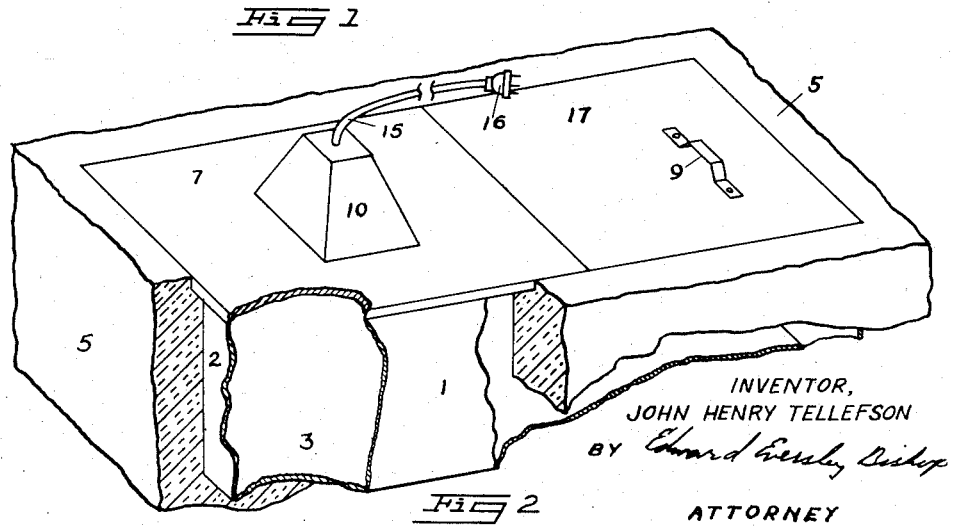
Figure 2 is an isomeric view of a tank with my heater installed thereon, partly broken away and in section.

With reference now to the drawings, there is shown a stock watering tank substantially rectangular in shape and preferably constructed of metal or other suitable material with vertical sides 1 and ends 2 and a bottom portion 3 joining the sides and ends. It will be obvious that the tank, while best constructed of suitable metallic material, could be of wooden or other construction if desired.

The exterior of the tank is insulated with suitable insulating material 5 which extends around the sides 1, ends 2 and bottom 3 of the tank and while a variety of materials could be used, I have found a light weight concrete mixture having cellular construction or including sawdust aggregates to be suitable for this purpose. To provide a seat for the cover of the tank, I have recessed the insulating material as indicated at 6 so that the cover composed of the two sections 7 and 17 will seat flush with the upper edge of the insulating material 5.

The cover formed in two sections 7 and 17, has the section 17 provided with a handle or like device 9 which allows the removal of the section 17 to open the tank and permit the water 4 to be reached as required. Section 7 is provided with an opening 8 located substantially centrally in the section and the housing, referred to generally by the numeral 10 is adapted to cover this opening 8 as indicated. The housing 10, in the preferred embodiment illustrated, is in the form of a truncated pyramid and has a metallic outer shell which is formed inwardly and downwardly as indicated at 11 and 12 along its lower edge to seat accurately in the opening 8. The interior of the shell 10 is provided with fireproof insulation 13 which may be any one of the well known fire clay products and a socket 14 is imbedded in the insulating material at the top thereof. The socket 14 is connected to a suitable electrical outlet through the wiring 15 and plug 16 and it will be obvious that the lamp 17 in the socket 14 will be lighted whenever the plug 16 is connected to a source of electric current.

When the device is assembled substantially as illustrated and described and with the cover 10 in place on the opening 8, the lamp 17, when lighted, will direct heat downwardly through the opening 8 and along the space 9 between the top of the water 4 in the tank and the cover 7 and 17 to prevent the surface of the water from freezing.

What I claim as my invention is:

1. A tank construction to inhibit the formation of ice on the surface of water in such tank comprising, a tank adapted to contain water and having an open top, insulating material applied around the sides and bottom of the tank and forming the exterior surface of the tank, a peripheral recess in the top of the insulating material, a cover for the open top of the tank seated in the said recess in the insulating material, an opening through the cover, a housing having an open end and formed at the open end to seat releasably in the opening and heating means secured in the housing.

2. The apparatus as claimed in claim 1 wherein the cover is sectional with the said opening through one of the sections and the housing is in the form of a truncated pyramid comprising an outer rigid shell with fireproof insulating material secured on the inside of the shell.

References Cited in the file of this patent

UNITED STATES PATENTS

| | | |
|---|---|---|
| 1,190,795 | Perkett | July 11, 1916 |
| 1,719,100 | Chisholm | July 2, 1929 |
| 1,793,431 | Pelmulder | Feb. 17, 1931 |
| 2,466,135 | Townsend | Apr. 5, 1949 |
| 2,509,460 | Transue | May 30, 1950 |
| 2,566,990 | Mahle | Sept. 4, 1951 |
| 2,611,953 | Kerby | Sept. 23, 1952 |
| 2,678,026 | Rue et al. | May 11, 1954 |
| 2,709,418 | Tibbetts | May 31, 1955 |